Jan. 21, 1958 R. E. SCOTT 2,820,270
METAL FASTENER ASSEMBLIES
Filed Aug. 10, 1951 3 Sheets-Sheet 1

INVENTOR
ROBERT E. SCOTT

BY *Strauch, Nolan & Diggins*
ATTORNEYS

Jan. 21, 1958 R. E. SCOTT 2,820,270
METAL FASTENER ASSEMBLIES
Filed Aug. 10, 1951 3 Sheets-Sheet 2

INVENTOR
ROBERT E. SCOTT
BY Strauch, Nolan & Diggins
ATTORNEYS

Jan. 21, 1958 R. E. SCOTT 2,820,270
METAL FASTENER ASSEMBLIES
Filed Aug. 10, 1951 3 Sheets-Sheet 3
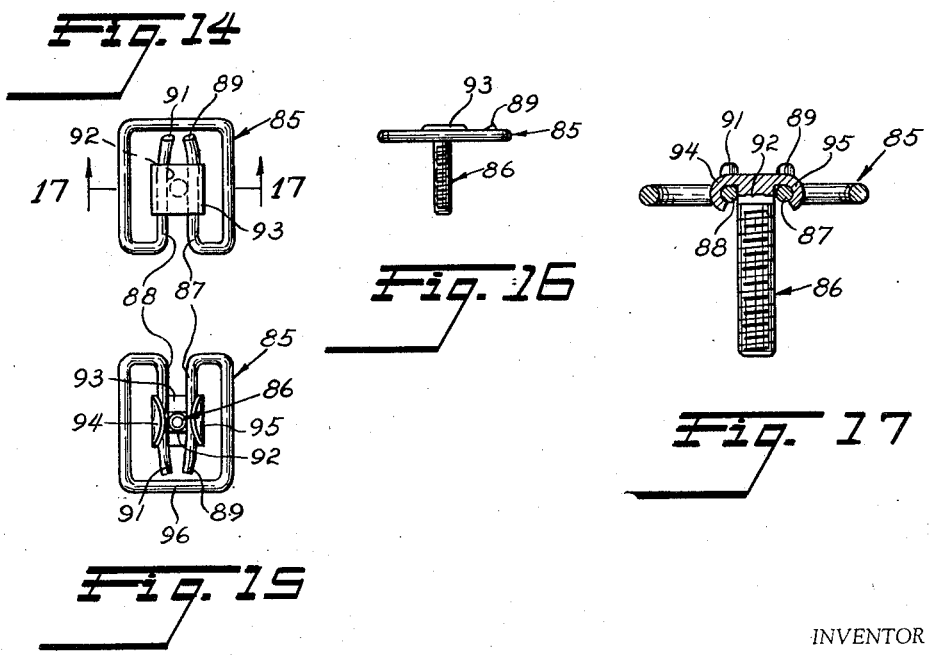
INVENTOR
ROBERT E. SCOTT
BY Strauch, Nolan & Diggins
ATTORNEYS

# United States Patent Office 2,820,270
Patented Jan. 21, 1958

2,820,270

METAL FASTENER ASSEMBLIES

Robert E. Scott, Detroit, Mich., assignor to Gagnier Fibre Products Company, Detroit, Mich., a corporation of Michigan Application August 10, 1951, Serial No. 241,179

8 Claims. (Cl. 24—73)

This invention relates to fastener assemblies such as are used for mounting moulding strips on automobile bodies and general purpose use and is particularly concerned with such fasteners which embody a special metal retainer device in novel association with a bolt or like attachment element.

It is therefore the major object of the invention to provide a novel fastener assembly wherein a retainer for the molding to be supported is formed of one piece or length of metal and includes a special non-rotatable connection with a bolt or like element for mounting the article upon a support.

A further object of the invention is to provide a novel fastener assembly wherein a retainer made of a suitably formed length of metal includes an elongated integral socket portion for non-rotatably receiving a bolt or the like.

A further object of the invention is to provide a novel retainer comprising a single length of metal having an intermediate portion shaped to provide a narrow elongated socket open at one end for reception of a non-circular portion of an attachment bolt or the like.

It is a further object of the invention to provide a fastener assembly comprising a resilient retainer formed of a single length of metal including an integral intermediate open-ended socket for non-rotatable assembly with an attachment bolt or the like, and wherein compression of the retainer during its assembly with the moulding or like article to be supported tends to close the open end of the socket and clamp the bolt more tightly therein.

Further objects of the invention will appear as the description continues with reference to the appended claims and the annexed drawings wherein:

Figure 14 is a top plan view of a further form of fastener assembly wherein the integral socket is formed at the ends of the length of metal and the bolt or the like is clamped tightly therein;

Figure 15 is a bottom plan view of the fastener assembly of Figure 14;

Figure 16 is a side elevation of the fastener assembly of Figures 14 and 15; and Figure 17 is a section on line 17—17 of Figure 14.

Figure 1:
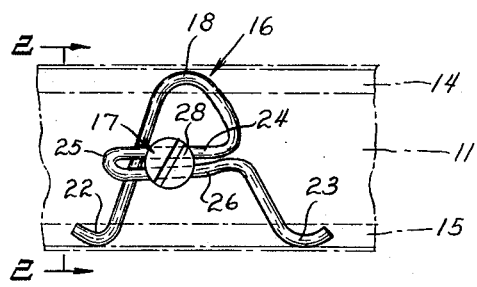
Figure 1 is a side elevation of a fastener assembly according to a preferred embodiment of the invention as employed for mounting a strip of trim moulding on an automobile body.
Figure 2:
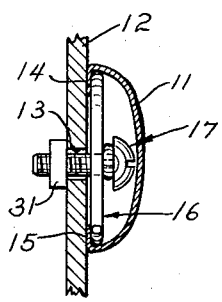
Figure 2 is a section on line 2—2 of Figure 1.

Referring to Figures 1–6 a strip of sheet metal moulding 11 is mounted on a support 12 having a series of apertures 13 spaced along the strip. As illustrated in Figure 2, strip 11 is formed with inwardly bent flanges 14 and 15 that define a longitudinal channel for reception of the retainers 16 such as those illustrated in Figure 3.

Figure 3:
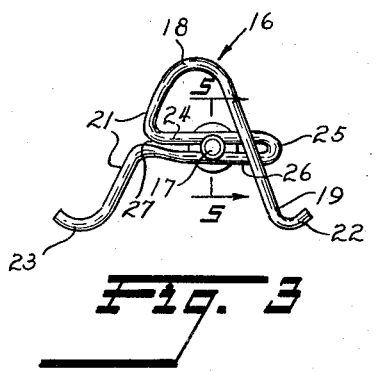
Figure 3 is a side elevation opposite that of Figure 1 illustrating the fastener assembly.

Each fastener assembly of the invention comprises a retainer 16 shaped to resiliently interfit with the moulding and a bolt member 17 non-rotatably mounted on the retainer. Referring to Figure 3, the retainer 16 comprises a single length of metal that will substantially retain its given shape. The length of metal 16 is preferably a section of stiff round steel wire but it may comprise any other length of metal such as sheet metal or the like formed by stamping, bending or any suitable metal working process. Retainer 16 is generally V-shaped being formed with a rounded section 18 at the apex of similarly and oppositely inclined spring legs 19 and 21. Legs 19 and 21 terminate in rounded foot portions 22 and 23 respectively which are preferably about equidistant from the apex 18.

Leg 19 is substantially straight, but leg 21, about halfway between the apex 18 and foot 23 is formed with an integral transverse narrow generally U-shaped bolt receiving socket loop defined by arm 24 extending toward and behind leg 19, an arcuate loop end 25 and an arm 26 that is parallel to arm 24 over most of their coextensive lengths. Where arms 24 and 26 join leg 21 they extend toward each other to form a restricted resilient neck 27 the purpose of which will appear. Preferably this socket is disposed as closely as possible to the common plane of the legs 19 and 21 and contacts the rear side of leg 19.

Figure 5:
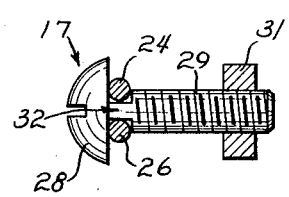
Figure 5 is a section on line 5—5 of Figure 3 showing the flat bolt shank section.
Figure 4:
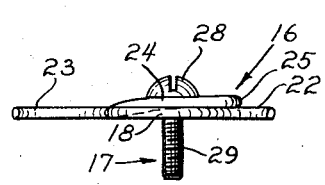
Figure 4 is a top plan view of the fastener assembly of Figure 3.
Figure 6:
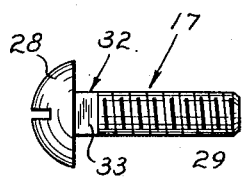
Figure 6 is a side elevation of the bolt turned 90° from Figure 5.

Referring to Figures 5 and 6 the bolt member comprises a conventional head 28 and threaded shank 29 adapted to receive a nut 31, but the bolt is modified to non-circular form in the short shank section 32 between the head and threaded portion. In the illustrated embodiment, shank section 32 is a flat-sided isthmus of substantially rectangular cross-section that is slidably and non-rotatably mounted in the loop between arms 24 and 26, its flat sides 33 (Figure 6) being slidably engaged with the generally parallel portions of the arms 24 and 26. Shank section 32 is axially short so that since the bolt head and the threaded part of the shank are larger than the space between arms 24 and 26, the bolt is held against axial displacement on the retainer.

Preferably in the fastener assembly as it exists apart from the moulding, the bolt 17 is so mounted that its travel along the socket the right in Figure 3 is stopped by leg 19. Its travel to the left in Figure 3 is arrested by neck 27 which is slightly narrower than the width of isthmus 32. The bolt may be separated from the assembly by spreading arms 24 and 26 to widen neck 27 when desired. Thus I provide a very flexible and adaptable fastener assembly wherein the bolt is efficiently held non-rotatably assembled upon the retainer but the two have freedom for relative movement as afforded by the slide socket, which feature is of great importance in mounting mouldings because of the possible tolerances of the parts involved and variations in spacing of apertures 24.

When the retainer is fitted with the moulding 11, the straight line distance between the apex 18 and the base line between feet 22 and 23 is slightly shorter than the distance between opposite sides of the moulding channel so that the retainer is compressed as it is slid into the channel. This compression is permitted by relative movement of legs 19 and 21 for spreading apart feet 22 and 23 whereby the entire retainer becomes a spring unit frictionally connecting itself to the moulding and slidable along the moulding channel upon the application of sufficient force. A very desirable result of this compression movement in the fastener of the invention is the fact that such tends also to move the open ends of arms 24 and 26 toward each other whereby neck 27 is further narrowed and the socket may tighten about the shank section 27. This insures that the bolt and retainer do not become disassociated within the moulding.

Referring to Figure 2, when nut 31 is drawn tight, the moulding flanges are pulled into surface contact with the support. Since the socket arms extend behind leg 19 the whole retainer remains a rigid undeformed connection between the moulding and the bolt, and the spring urged frictional coaction of the retainer and moulding is substantially not altered.

Figures 7–13 illustrate a further embodiment of the invention wherein a different form of fastener assembly mounts a different type of moulding. Moulding strip 34 comprises a substantially flat vertical portion 35 reversely bent along its lower edge to provide a channel defining flange 36. Along the upper edge of the strip is provided a bead 37 formed by a narrow outwardly bent portion 38 which is turned back inward at about 90° to provide a wider inclined portion 39 that terminates in a downwardly directed channel defining flange 41 substantially vertically aligned with flange 36. This bead appears as a deep recess 42 along the upper edge of the moulding.

The fastener in this embodiment comprises a retainer 43 and a bolt 44, the latter being preferably identical with bolt 17 except that its head is flattened at 45 to clear the strip.

Figure 7:
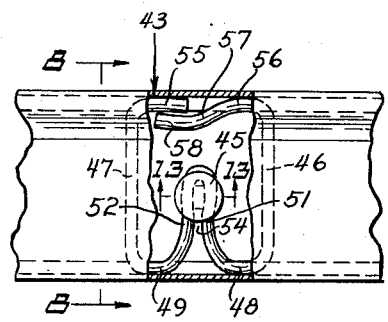
Figure 7 is a side elevation of a different type of moulding as mounted by a fastener comprising a further embodiment of the invention.
Figure 8:
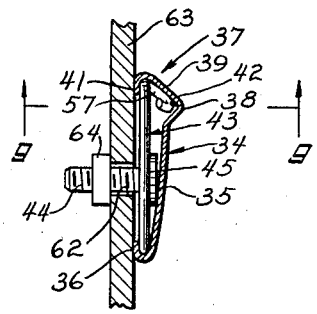
Figure 8 is a section on line 8—8 of Figure 7.
Figure 9:
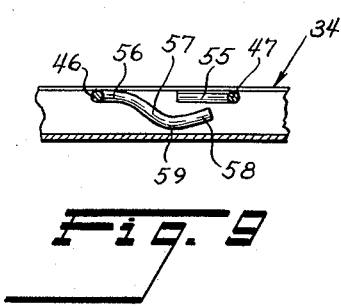
Figure 9 is a section on line 9—9 of Figure 8.
Figure 10:
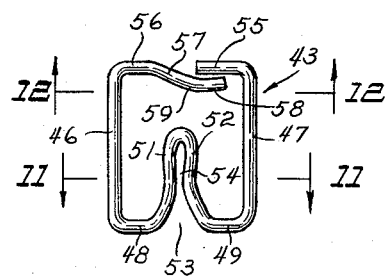
Figure 10 is a side elevation of the fastener of Figure 7 on the opposite side from Figure 7.

Referring to Figures 7 and 10, the fastener 43 is formed from a single length of sheet metal or stiff metal wire to define a substantially rectangular rigid structure having parallel sides 46 and 47. The lower end of fastener 43 comprises moulding engaging arms 48 and 49 extending toward each other integrally and in alignment from sides 46 and 47, respectively. At their inner ends, arms 48 and 49 are integrally connected by an elongated narrow generally U-shaped socket defined by arms 51 and 52. As illustrated in Figures 7 and 10, the socket comprises a diverging mouth 53 leading to a restricted neck 54. Between neck 54 and the rounded closed end of the socket arms 51 and 52 are preferably substantially parallel so as to permit some relative sliding of the bolt 44 along the socket.

Figure 12:
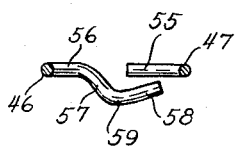
Figure 12 is a section on line 12—12 of Figure 10.
Figure 11:
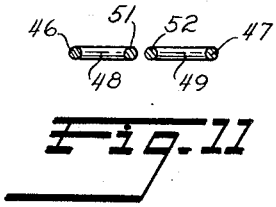
Figure 11 is a section on line 11—11 of Figure 10.

At its upper end, side 46 is bent toward side 47 at 90° in its plane to provide a short moulding engagement arm 55. The upper end of side 47 is similarly bent toward and in alignment with arm 55 to provide a short moulding engagement arm 56. Sides 46 and 47, and arms 48, 49, 51, 52, 55 and 56 all lie in a common plane which may be identified as the major plane of the retainer. Referring to Figures 10 and 12, beyond the end of arm 56 the wire is bent outwardly from the above plane and slightly downwardly out of alignment with arm 55, this bent section being indicated at 57. At the end of section 57, the metal piece extends to provide an integral terminal section 58 that is parallel to arm 55 when viewed in elevation as in Figure 10, and when viewed from the top as in Figure 12 provides a rounded bead engaging portion 59 before extending back toward but short of the above defined major plane of the retainer. As illustrated in Figure 10, terminal section 58 stops short of side 47.

Figure 13:
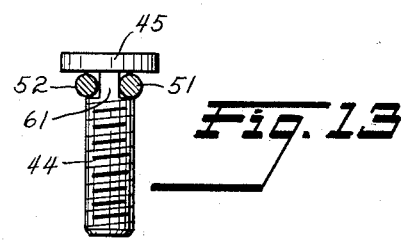
Figure 13 is a section on line 13—13 of Figure 7.

Bolt 44 has a flat-sided shank section 61 which as shown in Figure 13 fits non-rotatably and slidably between arms 51 and 52 of the socket, and relative sliding movements of the retainer and bolt are limited by the closed socket end and the restricted neck 54, the latter preferably being narrow enough to retain the bolt in assembly with the retainer before the moulding is mounted on it.

In using this fastener assembly, the bolt and retainer are preassembled by forcing shank 61 through resilient neck 54, with the bolt shank projecting oppositely from the bead engaging portion 59. Then, with the flat bead of the bolt adjacent the strip 35, the retainer is slidably moved in its major plane into the open end of the moulding, with arms 48 and 49 in sliding contact with the lower channel defining flange 36 and arms 55 and 56 in sliding contact with the upper channel defining flange 41. The side 46 first enters the moulding so that inclined section 57 cams over the moulding edge as it enters and rounded section 59 is seated and slides in recess 42.

Since the retainer is of spring metal and suitably dimensioned, the spring action between the free arms at the upper end of the retainer tends to frictionally maintain the assembly in a given longitudinal position along the moulding, and when bolt 44 is passed through aperture 62 in support 63 and nut 64 tightened, the moulding is pulled against the support without affecting the spring holding action of the upper end of the retainer. In this embodiment the bolt and retainer, by reason of their freedom for relative sliding at the socket facilitate mounting of the moulding on the support.

Referring now to Figures 14–17, the illustrated fastener herein there comprises a head 85 and a threaded shank 86. Head 85 is formed of a single length of metal looped about in a plane to define a rigid substantially rectangular area and outline with its ends inturned into the interior of the rectangle to provide an integral socket including legs 87 and 88. As illustrated in Figures 14 and 15, both of legs 87 and 88 have their tip ends 89 and 91 extending a small distance out of the plane of the head in a direction away from the shank 86.

In this form of the invention, the shank 86 has a flat sided portion 92 clamped between socket legs 87 and 88 and a sheet metal cap 93 which may be integral with the shank having side ears 94 and 95 bent over and partly around legs 87 and 88, to secure shank 86 non-rotatably to the head. If desired ears 94 and 95 may be loose enough to permit some sliding displacement of the shank 86 along the socket but usually ears 94 and 95 are clamped so friction tight that shank 86 is rigid with head 85.

In this fastener assembly I may provide a resilient sealing plug of synthetic rubber or a rubber-like plastic surrounding the upper part of shank 86 and molded permanently about cap 93 and ears 94 and 95 and the adjacent areas of the socket legs. In use, the head 85 is frictionally received within a length of moulding and shank 86 passed through a support aperture to receive a retainer nut. In the illustrated fastener, surfaces 96 and 97 are parallel and spaced to frictionally fit within a length of moulding like that of Figure 1.

In the foregoing I have described three embodiments of the invention and it will be obvious that many other physical embodiments are within its scope, the disclosure herein being illustrative and not restrictive. In all forms of the invention, there is the common feature of a suitably formed metal retainer having an open ended elongated integral socket for non-rotatable assembly with the bolt, and wherein tightening of the bolt on the support does not weaken the holding action of the retainer. The term "bolt" includes threaded and non-threaded shanked holding devices. In all embodiments the metal of the retainer is stiff enough to retain its given shape and thus define a relatively rigid structure, the free ends of the metal having spring holding functions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fastener assembly for mouldings and like articles, a generally flat head structure comprising a single piece of metal formed into a general inverted V-shape having an apex and diverging spring legs terminating in feet constituted by free ends of the metal piece, an elongated bolt receiving socket integrally formed with one of said legs having an open mouth at said one leg and projecting toward the other of said legs, and a bolt having a head and a threaded shank and an intermediate section between its head and shank clamped in said socket against both rotation and axial displacement with respect to said head structure.

2. In a fastener assembly for mouldings and like articles, a length of stiff metal formed into a substantially closed outline figure structure lying substantially in a plane with one side of said structure comprising the free end sections of said metal projecting toward each other in alignment, an integral projection on one end section of said metal displaced out of said plane and extending past the other end section to provide for flexible connection with said article, an elongated loop integrally formed in another side of said structure having an open mouth at the periphery of said structure and projecting interiorly of said structure substantially in said plane, and a bolt having a head section clamped in said loop against both rotation and axial displacement with respect to said structure.

3. A moulding or like fastener assembly comprising a single length of metal having a plurality of angularly disposed portions defining a generally flat substantially closed outline head structure adapted to frictionally fit within said moulding, the opposite ends of said length of metal being inturned within said structure to provide adjacently spaced legs defining a narrow integral socket, and a bolt having a portion of its shank non-rotatably clamped between said legs and projecting at an angle to said head structure.

4. In a fastener assembly for attaching moulding strips to support structures, a single length of metal formed with a plurality of angularly disposed portions defining a generally flat head structure adapted to resiliently and frictionally fit within said moulding strip so as to be slidable along said strip to line up with a hole in the support structure, two of said head portions extending generally side by side and defining an elongated headed bolt receiving socket in said head, and a threaded bolt projecting at right angles to said head to pass through said hole having its headed end clamped within said socket to prevent rotation and axial displacement of said bolt with respect to said head structure.

5. In the fastener assembly defined in claim 4, said bolt having a threaded shank and an enlarged head disposed on opposite sides of said socket and having a non-circular section gripped within the socket.

6. In the fastener assembly defined in claim 4, said bolt having a threaded shank and an enlarged head disposed on opposite sides of the socket, an intermediate section connecting the head and shank gripped within the socket, and lateral extensions on said head clamped over the adjacent socket portions.

7. In a fastener assembly for mounting moulding strip upon a support structure, a single length of metal having a plurality of angularly disposed portions defining a relatively rigid flat head structure for frictionally and slidably fitting within a moulding strip and having opposite free ends adapted to resiliently engage said strip, an elongated bolt-receiving socket defined by two side-by-side portions of said head structure, said socket being closed at one end and open at the other end at the periphery of said head structure, and a threaded headed bolt projecting from said head structure and having its headed end clamped within said socket.

8. In a fastener assembly for mouldings, a suitably formed single length of metal having a plurality of angularly disposed portions defining a generally flat head structure having a peripheral portion for engaging the moulding at one region and an opposed flexible peripheral portion comprising at least one free end section of said length of metal for engaging the moulding at another region so that said head structure may be resiliently slidable within said moulding, an elongated bolt-receiving socket integrally formed in said length of metal intermediate its ends by side-by-side portions of said head structure, said socket having an open end at the periphery of said head structure, a threaded bolt projecting from said head structure and means clamping the bolt non-rotatably and against axial displacement in said socket.

References Cited in the file of this patent
UNITED STATES PATENTS

| | | |
|---|---|---|
| 730,136 | Lantz | June 2, 1903 |
| 1,049,055 | Crowell | Dec. 31, 1912 |
| 1,084,209 | Hodgson | Jan. 13, 1914 |
| 1,222,453 | Otte | Apr. 10, 1917 |
| 1,481,396 | Ternes | Jan. 22, 1924 |
| 1,566,524 | Dahlgren | Dec. 22, 1925 |
| 1,981,314 | Ellis | Nov. 20, 1934 |
| 2,217,389 | Steger | Oct. 8, 1940 |
| 2,218,832 | Schroeder | Oct. 22, 1940 |
| 2,254,310 | Place | Sept. 2, 1941 |